United States Patent [19]

Hagiwara et al.

[11] Patent Number: 6,114,836
[45] Date of Patent: Sep. 5, 2000

[54] APPARATUS AND METHOD FOR CONTROLLING A POWER SOURCE APPLICABLE TO PORTABLE ELECTRONIC EQUIPMENT

[75] Inventors: Masahiko Hagiwara; Katsuo Ozawa, both of Tokyo, Japan

[73] Assignee: Kabushiki Kaisha Toshiba, Kawasaki, Japan

[21] Appl. No.: 09/048,992

[22] Filed: Mar. 27, 1998

[30] Foreign Application Priority Data

Mar. 27, 1997 [JP] Japan ................................. 9-075182

[51] Int. Cl.[7] ..................................................... H02J 7/00
[52] U.S. Cl. ............................................................ 320/132
[58] Field of Search .................................. 320/132, 134, 320/136, 162, 164, 131

[56] References Cited

U.S. PATENT DOCUMENTS

| 4,455,523 | 6/1984 | Koenck | 320/131 |
| 4,553,081 | 11/1985 | Koenck | 320/131 |
| 5,355,072 | 10/1994 | Satsuma et al. | 320/131 |
| 5,475,294 | 12/1995 | Isoda | 320/131 |
| 5,561,362 | 10/1996 | Kawamura et al. | 320/134 |
| 5,594,345 | 1/1997 | Boehm | 320/132 |
| 5,652,502 | 7/1997 | Van Phuoc et al. | 320/134 |
| 5,691,621 | 11/1997 | Phuoc et al. | 320/134 |
| 5,739,670 | 4/1998 | Brost et al. | 320/131 |
| 5,808,445 | 9/1998 | Aylor et al. | 320/132 |
| 5,826,958 | 10/1998 | Avitan | 320/131 |
| 5,942,878 | 8/1999 | Ito | 320/131 |
| 5,955,869 | 9/1999 | Rathmann | 320/132 |

Primary Examiner—Edward H. Tso
Assistant Examiner—Pia Tibbits
Attorney, Agent, or Firm—Oblon, Spivak, McClelland, Maier & Neustadt, P.C.

[57] ABSTRACT

An apparatus and method for controlling a battery power source of an electronic device by resetting battery information stored in a memory. In addition, the battery is discharged until a battery voltage reaches a prescribed discharge end voltage, even when the power source supply to the device is switched from the battery to another source. The battery information includes a realizable capacity and a residual capacity of the battery. The realizable capacity is a parameter used for indicating a battery performance and the residual capacity is used for calculating a usable residual time of the device.

26 Claims, 15 Drawing Sheets

APPARATUS AND METHOD FOR CONTROLLING A POWER SOURCE APPLICABLE TO PORTABLE ELECTRONIC EQUIPMENT

BACKGROUND OF THE INVENTION

1. Field of the Invention

The present invention relates to an apparatus and method for controlling a power source used in portable electronic equipment. More particularly, the present invention relates to an apparatus and method for controlling charge/discharge cycles of a battery power source used in portable electronic equipment, such as a portable type computer.

2. Discussion of the Background

In recent years, various types of mobile electronic equipment, such as a notebook type computer or a personal digital assistant device (PDA) have been developed. These electronic devices are usually designed to accommodate both power from a battery and an AC adaptor. The battery is needed in consideration of outdoor use when a commercial AC power source is unavailable.

Usually, a secondary battery, such as a nickel hydrogen battery and a lithium ion battery is used in this type of electronic equipment. When an AC adaptor is coupled to the electronic device, the power supply source is automatically switched from the battery to the AC adaptor. The battery is also charged through the AC adaptor.

Most of the battery-powered electronic devices include battery controlling functions, such as a low-battery detecting function and a battery state control function. The low-battery detecting function is used to detect a battery state when a battery voltage drops lower than a prescribed threshold voltage. The low-battery detecting function is also used to warn a user as to the low battery state. The low-battery detecting function may be achieved by using a discharge characteristics curve of the secondary battery.

FIG. 10 shows a typical discharge characteristics curve of the secondary battery. The characteristic curve illustrates the output voltage of the secondary battery decreasing as a discharge time of the battery increases. Usually, when the voltage of the secondary battery drops below a prescribed level, the performance of the battery deteriorates and diminishes.

To prevent such a defect state, a discharge end voltage ($V_{END}$) is usually defined as an allowed discharge limit voltage of the secondary battery. When the voltage of the secondary battery approaches the discharge end voltage ($V_{END}$), it is necessary to take certain precautions. The precautions include, for example, switching to the AC adaptor power source or saving the data. This is necessary to prevent a loss of data due to a lack of battery power. For this purpose, the low-battery detecting function should be able to warn a user about the dangerously low state of the battery. In addition, the precautions should be performed while there is still a sufficient amount of time left for the user to switch to the AC adaptor power source or to save the data before the secondary battery reaches the discharge end voltage ($V_{END}$).

Accordingly, a low-battery detection voltage ($V_{LB}$) is set for detecting the low battery state at a voltage value that will occur at a prescribed time prior to reaching the discharge end voltage ($V_{END}$). As depicted in FIG. 10, by using the discharge characteristics of the secondary battery, the voltage value of the low-battery detection voltage ($V_{LB}$) is set at a prescribed time before the discharge end voltage ($V_{END}$).

The battery state control function controls the default state of the battery by using battery information recorded in a recording means provided in the battery unit. The recorded battery information contains information, such as a realizable capacity and a residual capacity.

The realizable capacity is a parameter used for indicating a battery performance. It indicates a maximum value of the discharge capacity of the battery from a fully charged state to the discharge end voltage ($V_{END}$). The residual capacity is used for calculating a usable residual time of the device.

Each time the battery completes a charging/discharging cycle, the battery state control function updates the battery information. The information is updated to a latest realizable capacity value or a latest residual capacity value. The residual capacity is determined by calculating a difference between the discharging capacity and the realizable capacity stored in the recording means. Similarly, the realizable capacity is determined by calculating a difference between the charging capacity and the residual capacity. The values are also updated before the start of next charging or discharging cycle of the battery.

FIG. 11 illustrates repeated battery charge/discharge cycles for a fully charged new battery (i.e., the battery has no deterioration) installed in an electronic device. The new battery discharges when it is used as the power source. Further, the battery is charged when an AC adaptor is used as the power source. During the operation of the electronic equipment, the battery repeats these charge/discharge cycles. With reference to FIG. 11, these cycles will now be explained.

Battery discharge cycle 1:

After installing the fully charged new battery into the electronic device, a power source switch is turned on. At this initial operation time, the realizable capacity value and the residual capacity value of the battery are read from the memory. In this case, at first, the realizable capacity value of the battery equals the residual capacity value of the battery. The residual capacity value read from the memory is used for calculating the usable residual time of the electronic device. A user of the device is informed of the calculated usable residual time by using an appropriate indication, such as a display.

The battery is discharged when it is used during the operation of the electronic device. The discharge of the battery is stopped when the battery powered operation is turned off or the device is switched to the AC adaptor power source. In these cases, the used discharge capacity value that has discharged from the battery up to the switching time is subtracted from the initially stored realizable capacity value (i.e., the realizable capacity minus the used discharge capacity). The result of the subtraction is stored as a new residual capacity value in the memory of the battery unit.

Battery charge/discharge cycle 2 (This is also the same as the battery charge/discharge cycle 3):

By switching to the AC adaptor power source, the battery begins to be charged. When it has been fully charged, the charging capacity value at that time is added to the residual capacity value previously stored in the memory prior to the battery being charged. In addition, the result of the addition is written into the memory device of the battery as the latest realizable capacity value of the battery. When the battery is again used as the power source, the battery begins to discharge. When the discharge of the battery reaches a low-battery state, the low-battery detecting function transmits a warning to the user. As the power source is switched from the battery to the AC adaptor, the battery stops discharging. At this stage, the used discharge capacity value that has discharged from the battery up to that time is subtracted from the stored realizable capacity value. The result of the subtraction is written into the memory device of the battery as the latest residual capacity value.

As explained above, in the conventional method, the battery power supply is immediately stopped once when the power source is turned off or switched to the AC adaptor power source. This is performed without any consideration of whether or not the low-battery state has been detected. In addition, the latest residual capacity value is calculated by the subtraction of the realizable capacity value minus the discharge capacity value and written in the memory. Also, when the charging of the battery has been completed, the charged capacity value is added to the stored residual capacity value for calculating the latest realizable capacity value of the battery.

However, the performance of the secondary battery used with a portable personal computer naturally diminishes with the number of repetitions of these charge/discharge cycles. That is, the secondary battery has a characteristic that the actual realizable capacity value gradually declines depending upon the number of repetitions of the charge/discharge cycles.

Consequently, the discharged capacity value from the fully charged state of the battery to a certain residual capacity value may not always be equal to the charging capacity value. The charging capacity value is determined from when the battery is charged from the low battery state to the fully charged state. That is, after repeating the charge/discharge cycles many times, the actual realizable capacity value of the battery becomes smaller than the calculated realizable capacity value.

Therefore, the conventional calculation method for obtaining the latest values of the realizable capacity and the residual capacity includes an error. Although this error is relatively small when the repetition of charge/discharge cycles is small, as the repetition of charge/discharge cycles increases, the errors or differences severely increase. Then it becomes impossible to correctly calculate the residual time of the battery.

The discharge characteristics of the battery also vary as the repetition of the charge/discharge cycles increases. Consequently, it is necessary to dynamically update the aforementioned low-battery detection voltage ($V_{LB}$) to match such a change in the discharge characteristics.

However, in the conventional method, the low-battery detection voltage ($V_{LB}$) is always maintained at a constant value. Therefore, the low-battery state may not be detected even when the battery has reached the low-battery state.

As mentioned above, in the conventional method, the battery state is controlled without considering the characteristics of the battery in which the realizable capacity gradually declines with an increase in repetitions of charge/discharge cycles of the battery. Accordingly, as the repetition of the charge/discharge cycles increases, the errors between the calculated values and actual values of the realizable capacity and the residual capacity become inevitably larger. As a result, it becomes impossible to know the correct residual time for using the battery as the power source of the electronic device. This is a severe disadvantage with the conventional apparatus and method for controlling the power source.

Further, because the conventional method uses a constant value for the low-battery detecting voltage and does not consider changes in the discharge characteristics of the battery, it becomes impossible to detect the low-battery state correctly. This is another severe disadvantage with the conventional method and apparatus for controlling the power source.

SUMMARY OF THE INVENTION

Accordingly, it is an object of the present invention to solve the aforementioned problems and defects of the conventional apparatus and method for controlling the power sources of portable electronic equipment.

It is another object of the present invention to provide an apparatus and method for controlling a power source used for portable type electronic equipment by detecting a low battery state with accuracy.

It is a further object of the present invention to provide an apparatus and method that constantly maintains a battery power source at a correct state.

It is a further object of the present invention to provide an apparatus and method for controlling the battery power source that can accurately detect a present state of the battery by periodically clearing to zero accumulated errors during calculations of values for the realizable capacity and the residual capacity of the battery with an increase in repetitions of charge/discharge cycles.

It is still a further object of the present invention to provide an apparatus and method for controlling the battery power source that can constantly detect an optimum low battery state of the battery by dynamically adjusting the optimum battery detecting voltage corresponding to changes in the discharge characteristics of the battery.

In the apparatus and method for controlling the power source according to the present invention, the discharge of the battery does not immediately stop even when the battery power source is changed to the AC adaptor power source. Instead, the battery continues to discharge through a discharger until the battery voltage reaches the value of the discharge end voltage ($V_{END}$). Then, the discharge capacity value that is discharged from the battery during the period from the fully charged state to the discharge end voltage ($V_{END}$) is detected. The discharge capacity value is then written as the latest realizable capacity into the memory device. Further, the residual capacity is set to zero at this time.

In this way, according to the present invention, it is possible to correct an error accumulated value of the realizable capacity of the battery. This is performed by renewing the realizable capacity value in the memory based on the total discharge capacity once the battery is discharged to the discharge end voltage value ($V_{END}$).

Further, according to the present invention, such a forced discharging of the battery up to the discharge end voltage ($V_{END}$) is carried out only when the low-battery state ($V_{LB}$) is detected.

Consequently, according to the present invention, there is no wasteful discharge of the battery. Further, it is possible to clear to zero the calculation errors of the realizable capacity and the residual capacity of the battery which are accumulated during repetitions of the charge/discharge cycles. This is accomplished each time the low-battery state is detected so that the present battery state can be correctly controlled at all times.

These and other objects are achieved according to the present invention by providing an apparatus and method for controlling a power source of a battery for a battery driven electronic device. The device includes a memory in the battery for storing battery information including a realizable capacity value and a residual capacity value of the battery. The realizable value of the battery represents the maximum discharge capacity of the battery from the fully charged state to the prescribed discharge end voltage value. Further, the apparatus and method according to the present invention updates the battery information and controls the latest characteristic of the battery. The latest characteristic of the battery is determined by a difference calculation between the charge/discharge values and the realizable capacity/residual capacity value stored in the memory before the start of the charge/discharge cycle. This is performed each time a charge/discharge cycle is completed.

Further, the apparatus according to the present invention includes a means for detecting a total discharge capacity of the battery from a fully charged state to a time when the discharge cycle is completed, and a means for detecting a low-battery state of the battery based on a voltage of the battery. Also included is a means for continuing the discharge of the battery by coupling the battery to a discharger even when the power source of the electronic device is turned off or is switched to an AC adaptor power source. This is performed after the detecting means has detected the low battery state so as to continue the discharge cycle until the discharge end voltage is reached. Further included is a means for updating the battery information in the memory. The information is updated to a latest realizable capacity value by stopping the discharge of the battery through the discharge continuation means when the discharge end voltage is reached.

In addition, in the case that the stored battery information in the memory contains the low-battery detecting voltage value, it is further preferred to include a discharge detecting means for detecting the discharge characteristic of the battery. This is accomplished by monitoring the voltage and the discharge current of the battery. Also included is a means for updating the low battery state detecting voltage in the memory by calculating the latest low battery detecting voltage based on the discharge characteristics until the discharge end voltage is detected by the discharge detecting means when the battery has been discharged to the discharge end voltage through the discharger. In this way, according to the present invention, it becomes possible to dynamically change the low-battery detecting voltage value so as to correspond to the change in the discharge characteristics of the battery, and also to detect the low-battery state by constantly using an optimum low-battery voltage.

Instead of discharging the battery through the coupled discharger, it is also possible to discharge the battery to the discharge end voltage by continuing the battery drive operation of the electronic device. This method prevent a wasteful discharge from the battery.

Since the electronic device is coupled to the AC adaptor power source so as to fully charge the battery, the discharge of the battery usually begins from a fully charged state. However, if the AC adaptor power source has been removed before the battery is fully charged, the discharge of the battery begins from a non-fully charged state. In such a case, the realizable capacity is not updated during the battery information updating process. Instead, only the residual capacity is updated, and the value is set to zero. However, it is also possible to clear to zero the accumulated errors for the residual capacity value of the battery. As a consequence, if the battery is fully charged after that, it becomes possible to calculate the charging capacity from the discharge end voltage to the fully charged state as the latest realizable capacity value.

It is further possible to control the present battery state by using the residual capacity value only. In this case, only the residual capacity is set to zero during the battery information updating process. This can be realized in a computer system that controls the charge/discharge cycles of a secondary battery having a reloadable memory comprised of a means for measuring the discharge current and discharge voltage of the secondary battery, a means for continuing the discharge to the prescribed discharge voltage for the voltage of the secondary battery when the secondary battery is in the low-battery state, based on the results of the measuring means, and a means for writing the discharge capacity to the memory device when the voltage of the secondary battery reaches to the prescribed discharge voltage.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
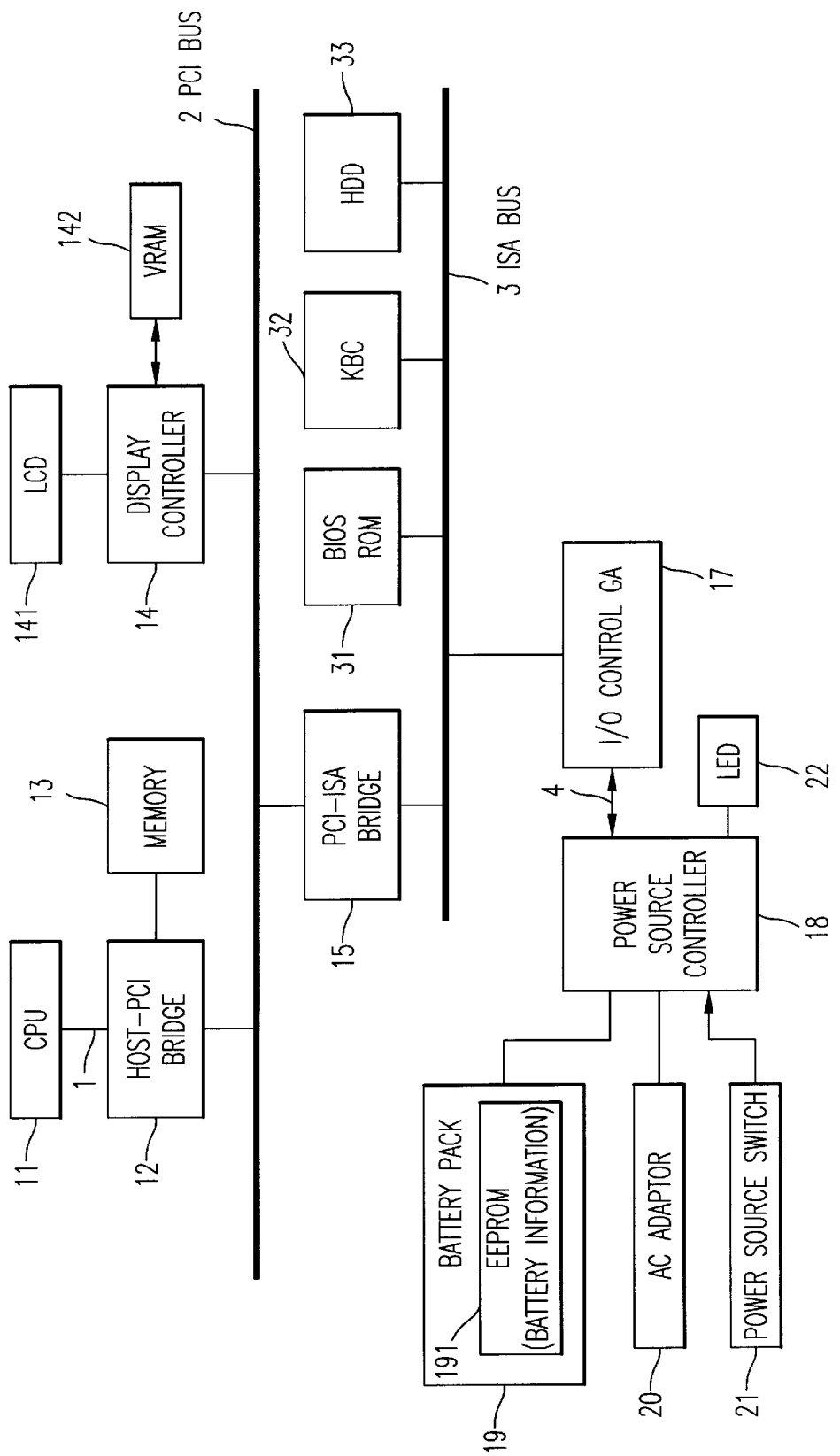
FIG. 1 is a block diagram illustrating components of a computer system using a power source control device in a preferred embodiment of the present invention.

Referring now to the drawings, wherein like reference numerals designate identical or corresponding parts through the several views, and more particularly to FIG. 1 thereof, there is illustrated a portable electronic device, such as a notebook or laptop personal computer that is driven by a battery power source. As shown in FIG. 1, the main body of the computer system includes a processor bus (1), a Program Controlled Interruption (PCI) bus (2), an ISA bus (3), an I C bus (4), a Central Processing Unit (CPU) (11), a host-PCI bridge device (12), a system memory (13), a display controller (14), a PCI-ISA bridge device (15), an Input/Output (I/O) control gate array (17), a power source controller (18), a battery pack (19), a Basic Input/output Operating System (BIOS) and a Read Only Memory (ROM) (31), a keyboard controller (KBC) (32) and a hard disk drive (HDD) (33), and so on.

The CPU (11) may be selected from the current computer market, such as a PENTIUM microprocessor (PENTIUM is the trademark of Intel Corp. U.S.A.). The processor bus (1) includes a 64-bit-width data bus and is directly coupled to the CPU (11). The system memory (13) is used as the main memory of the computer system and is coupled to the host-PCI bridge device (12) through a dedicated memory bus having a 32-bit-width or 64-bit-width data bus. In addition, an operating system, a device driver, an application program having an executable object for processing data etc., are stored in the system memory (13). It is also possible to use a data bus of the processor bus (1) as the data bus for the system memory (13). In such a case, the memory bus includes an address bus and various memory control signal lines.

The Host/PCI bridge device (12) is a Large Scale Integrated circuit (LSI) for coupling the processor bus (1) and the internal PCI bus (2). The host/PCI bridge device (12) functions as a bus master of the PCI bus (2) and performs bidirectional conversions of the bus cycles contained data and address between the processor (1) and the PCI bus (2). Further, the bridge device (12) has a function for accessing control of the system memory (13) through the dedicated memory bus.

The internal PCI bus (2) is a clock-synchronized input/output bus. All of the cycles on the internal PCI bus (2) are performed in synchronization with the PCI bus clock. The maximum frequency used for the PCI bus clock is 33 MHZ. The PCI bus (2) has a time-sharing address/data bus having 32-bit-width.

A data transferring cycle on the PCI bus (2) includes an address phase and one or more data phases succeeding the address phase. During the address phase, an address and a type of the transfer are supplied. During the data phase, data having a format of 8-bits, 16-bits, 24-bits, or 32-bits is supplied.

The display controller (14) also functions as a bus master for the PCI bus (2), similar to the host/PCI bridge device (12). The display controller (14) controls and displays image data of a Video Random-Access Memory(VRAM) (142), for example, on a liquid crystal display (LCD) (141) or a cathode ray tube(CRT) display.

The PCI-ISA bridge device (15) is also a bridge LSI for coupling the PCI bus (2) and the ISA bus (3). The BIOS ROM (31), the keyboard controller (KBC) (32), the HDD (33), and the I/O control gate array (17) are connected to the ISA bus (3).

The I/O control gate array (17) is also a bridge LSI for coupling the ISA bus (3) and the I C bus (4), and contains a plurality of read/write register groups that may be used to communicate with the CPU (11). Also, the register groups may be used to communicate with the power source controller (18).

The battery pack (19) contains a chargeable secondary battery, such a nickel-hydrogen battery or a lithium battery, etc. The battery pack (19) may be detachably installed in the main body of the computer. Further, the battery pack (19) contains an Electrically Erasable Programmable Read Only Memory (EEPROM) (191) for storing battery information. The battery information includes information, such as a type of the secondary battery, a realizable capacity of the secondary battery, a residual capacity, and a low-battery detecting voltage, etc. This battery information may be read by a power source controller (18) and used for controlling the charging process of the secondary battery and also to control the power source of the system.

As explained before, the realizable capacity is a parameter for indicating a performance of the secondary battery. It indicates a maximum discharge capacity value of the secondary battery that can be realized when the battery is discharged from a fully charged state to a discharge end voltage. The realizable capacity value is used in a calculation for obtaining a present residual capacity of the secondary battery. The calculated residual capacity of the secondary battery is used in a calculation for the residual usable time of the computer in a battery drive mode.

The power source controller (18) controls a power ON/OFF switching operation to the various units in the system in accordance with an operation of a power source switch (21) for supplying power source from the battery pack (19) or an external power source from an AC adaptor (20). The power source controller (18) includes a function for controlling the charge/discharge operation of the secondary battery in the battery pack (19) and also for detecting the low-battery state, etc.

The low-battery detecting function is used to detect when the consumption of the secondary battery is lower than a certain level and to warn a user. The low-battery detecting function is realized by making use of the discharge characteristics of the secondary battery of battery pack (19). Usually, a characteristic of the secondary battery is that its output voltage declines as the battery is discharged. When the voltage of the secondary battery declines to a value lower than a prescribed voltage, the performance of the secondary battery may be deteriorated. As explained before, such a lower limit voltage of the secondary battery is referred to as the discharge end voltage ($V_{END}$) As the discharge of the secondary battery proceeds and the battery voltage approaches the discharge end voltage ($V_{END}$), it is necessary to take certain steps, such as switching to the external power source by using the AC adaptor (20) or saving data to the HDD (33). This is necessary to prevent a loss of data due to a lack of power. For detecting the low-battery state of battery pack (19), the low-battery detecting function of the power source controller (18) uses a low-battery detecting voltage ($V_{LB}$) stored in the EEPROM (191). As a result, the low-battery detecting function can provide a warning to the user allowing a sufficient amount of time to switch the power source to the AC adaptor or to save data before the discharge end voltage ($V_{END}$) is reached. Such a warning of the low battery state may be made, for example, by lighting an LED lamp (22) mounted on the main body of the computer. The value of the low-battery detecting voltage ($V_{LB}$) stored into the EEPROM (191) is a certain value obtained from the characteristics curve and occurs at a time before the discharge end voltage ($V_{END}$).

The battery state control function controls a present state of the battery by using the battery information stored in the EEPROM (191) installed in the battery pack (19). According to the battery state control function, the latest realizable capacity value or the latest residual capacity value is calculated for updating the battery information in the EEPROM (191). This calculation is performed each time the charge/discharge of the secondary battery is completed. It is obtained by calculating differences between the current charge/discharge capacity value and the previously stored realizable capacity or residual capacity value in the EEPROM (191). Further, the calculated latest residual capacity is set into the register of I/O control gate array(17) and is read by the CPU (11) for calculating the residual useable time.

The battery state control function also contains a correcting function for clearing and setting to zero the accumulated errors under the balance calculations of the realizable capacity or residual capacity value. This correcting function is characterized in that the discharge of the battery is continued until it reaches the discharge end voltage ($V_{END}$). This occurs even after the power source is switched to the AC adaptor or the computer system is turned off after detecting the low-battery state.

The parameters discussed above, such as the data bus widths and clock frequencies, etc., are for illustration purposes only and are not intended to limit the scope of the invention.

Figure 2:
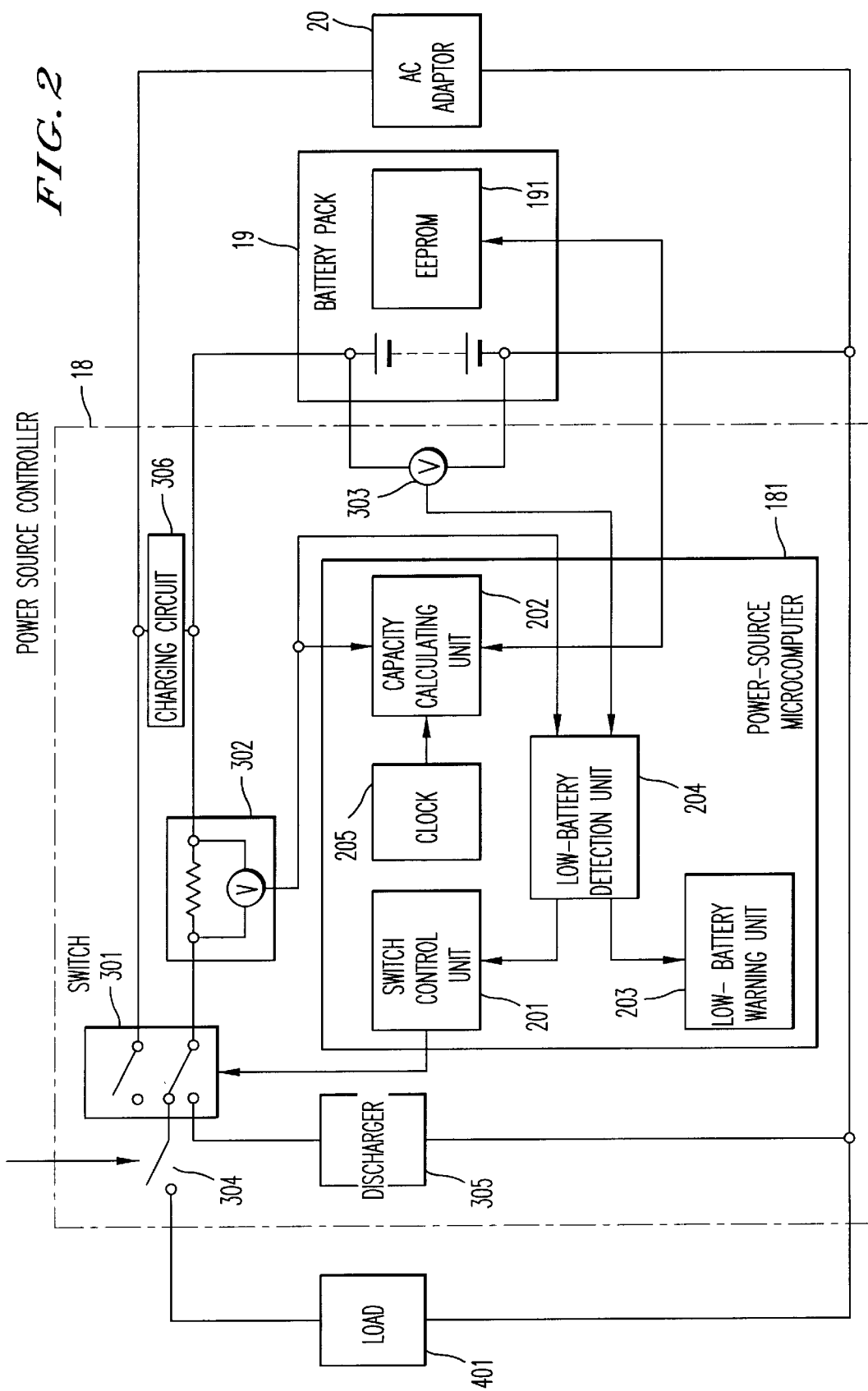
FIG. 2 is a block diagram illustrating an example of the power source control device of the aforementioned embodiment of the present invention.

FIG. 2 explains a specific configuration of the power source controller (18) depicted in FIG. 1.

The power source controller (18) includes a power source microcomputer (181) and a plurality of peripheral power source control circuits, such as a switching circuit (301), an ammeter (302), a voltmeter (303), a power source main switching circuit (304), a discharger (305), and a charging circuit (306).

To realize the low-battery detecting function and the battery state control function, the power source microcomputer (181) contains a switch control unit (201), a capacity calculating unit (202), a low-battery warning unit (203), a low-battery detection unit (204), and a clock (205). The switch control unit (201), the capacity calculating unit (202), the lowbattery warning unit (203), the low-battery detection unit (204), and the clock (205) are realized by using a control program that is executed by a microprocessor unit (MPU) in the power source microcomputer (181).

The switch control unit (201) controls the switching circuit (301) so as to switch the load for the secondary battery in the battery pack (19) and also to switch the power source of the computer system. In FIG. 2, the various object modules of the computer system are depicted as the load (401).

The capacity calculating unit (202) calculates the latest realizable capacity and residual capacity value of the secondary battery by calculating the differences between the charged/discharged capacity of the secondary battery and the stored battery information values in the EEPROM (191).

The discharged capacity of the secondary battery during the period from the beginning of the discharge to the discharge end is successively calculated. The calculation is performed by a multiplication of the discharged time and the discharge current. The discharge current is measured by the ammeter (302) and the discharge time is measured by the clock (205) during the battery discharge process. Similarly, the charged capacity is also obtained by a multiplication of the charging current flowing to the secondary battery through the charging control circuit (306) and the charging time.

The low-battery detection unit (204) detects the low-battery state based on the voltage of the secondary battery and the stored low-battery detection voltage ($V_{LB}$) in the EEPROM (191). Assuming that the detected low-battery voltage is $V_{LB}$ at the time when the discharge current is $I_{BAT}$, the low-battery detection unit (204) successively observes the discharge current and battery voltage respectively measured by the ammeter (302) and the voltmeter (303) during the discharge of the battery. In addition, the low-battery state is detected when the battery voltage $V_{BAT}$ corresponding to the discharge current $I_{BAT}$ becomes lower than the low-battery detection voltage $V_{LB}$.

When the low-battery detection unit (204) detects the low-battery state, the low-battery warning unit (203) issues a warning (low-battery warning) to a user, for example, by illuminating an LED (22) or sounding an alarm.

Figure 3A:
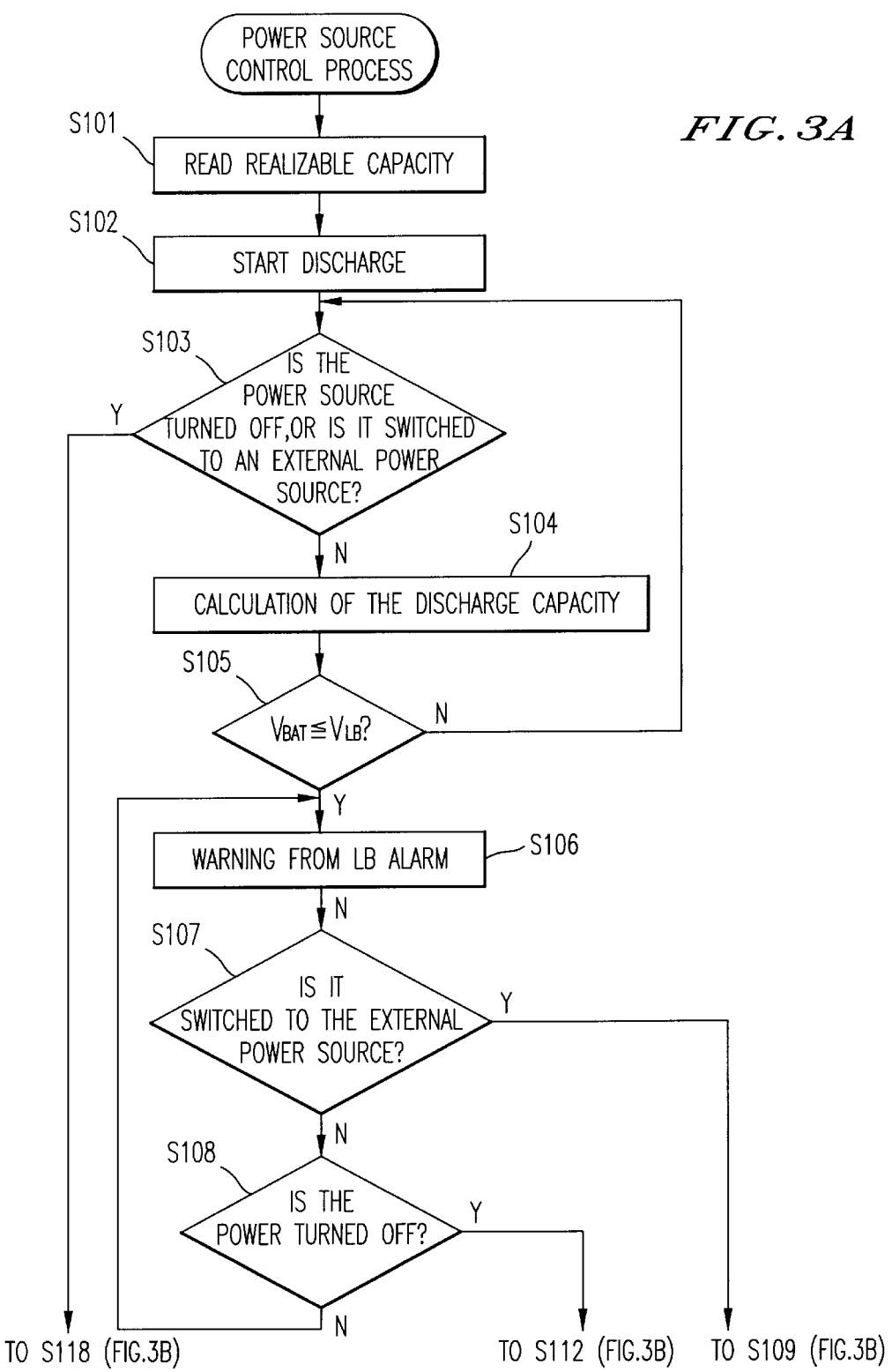
FIG. 3 is a flow chart illustrating the power source control process of a computer using the power source control device shown in FIG. 2.
Figure 3B:
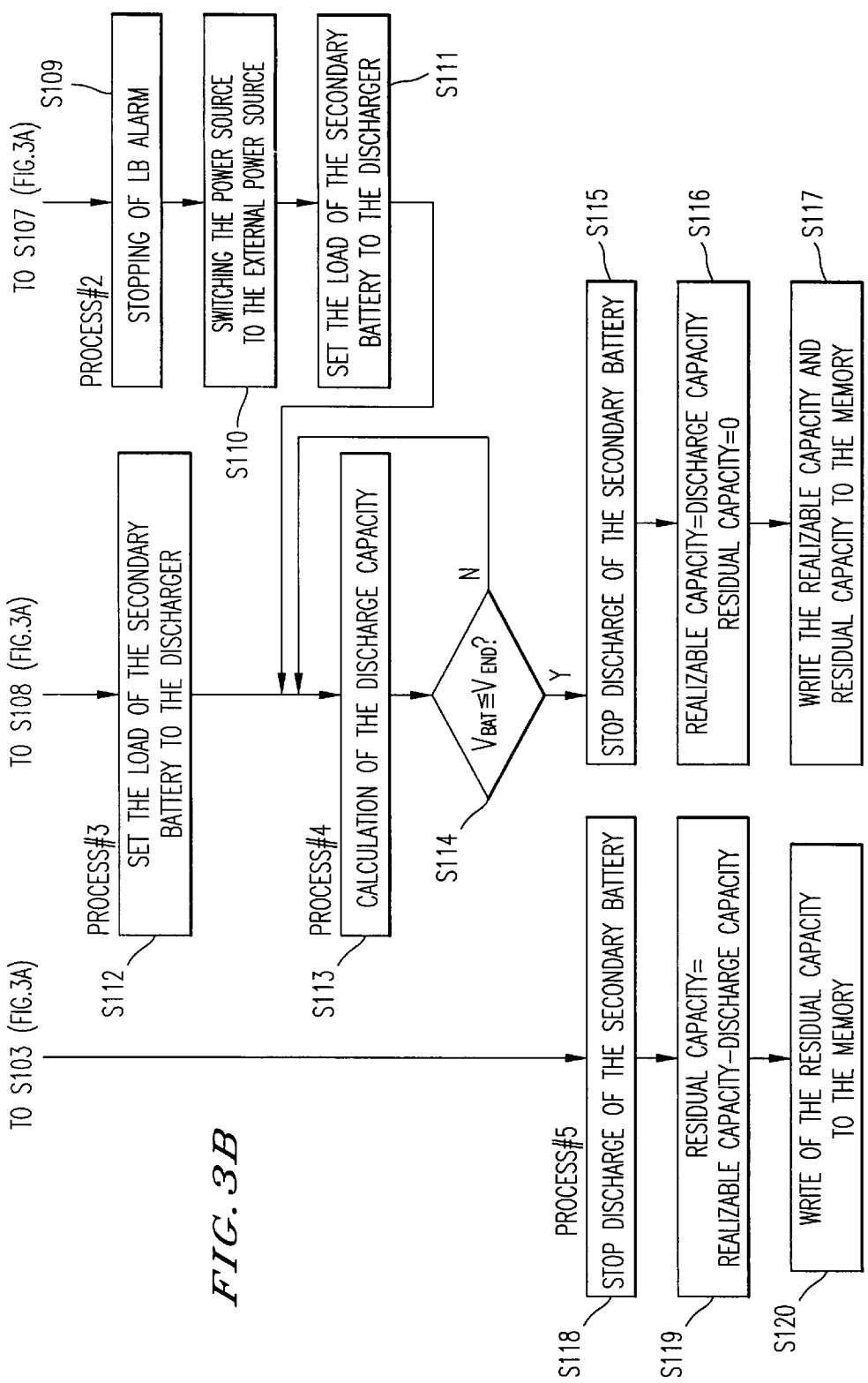

FIG. 3 explains the procedure of the power source control process.

When the battery pack (19) in FIG. 1 is installed into the main body of the computer, the power source microcomputer (181) reads the realizable capacity of the secondary battery from the EEPROM (191) (Step S101).

When the computer is switched on by turning the power source switch (21) and the switching circuit (304) is coupled to the load (401), the computer is driven by the secondary battery and the discharge of the secondary battery begins (Step S102).

During the discharge of the secondary battery, the calculation of the charging capacity and a check of whether or not the battery has reached a low-battery state is constantly performed (Steps S104 and S105).

If the computer is switched to the AC adaptor power source or is turned off by the power source switch (21) before the low-battery state is detected (Step S103), the procedure executes a process #5 in which the discharge of the secondary battery is stopped (Step S118). The power source microcomputer (181) then calculates the present residual capacity of the secondary battery by subtracting the current discharge capacity value as calculated by the capacity calculating unit (202) from the realizable capacity read from the EEPROM (191) (Step S119). The calculation result is then written into the EEPROM (191) (Step S120). Further, when the power source of the computer is switched from the secondary battery to the AC adaptor power source, the secondary battery is fully charged through charging circuit (306).

If the low-battery state is detected during the discharge of the secondary battery (Step S105), the low-battery warning unit (203) warns the user about the low-battery state (Step S106). If the user switches to the AC adaptor power source, the power source control process executes a process #2 in which the warning from the low-battery warning unit (203) is stopped (Step S109). Then, the power source of the computer is switched from the secondary battery to the AC adaptor by operating the switching circuit (301) (Step S110), and the secondary battery is continuously discharged by the coupled discharger (305) (Step S111).

Then, the power source control process executes a process #4 in which the discharge capacity is calculated (Step S113). Next, it is determined whether or not the battery voltage $V_{BAT}$ has reached the discharge end voltage $V_{END}$ (Step S114). If the battery voltage $V_{BAT}$ drops lower than the discharge end voltage $V_{END}$, the discharge of the secondary battery is stopped by switching off the secondary battery from the discharger (305) (Step S115). Then, the discharged capacity of the secondary battery from the beginning of the discharge to the end of the discharge (i.e. from the fully charged state to the discharge end voltage ($V_{END}$) is calculated as the latest realizable capacity value. Further, the realizable capacity and the residual capacity are written into the EEPROM(191) by setting the calculated latest residual capacity value to zero (Steps S116 and S117).

If the computer is turned off by operating the power source switch (21) after the low-battery state is detected (Step S108), the power source control process executes a process #3 in which the secondary battery is coupled to the discharger (305) (Step S112). Then, the process #4 is executed as explained before.

Figure 4:
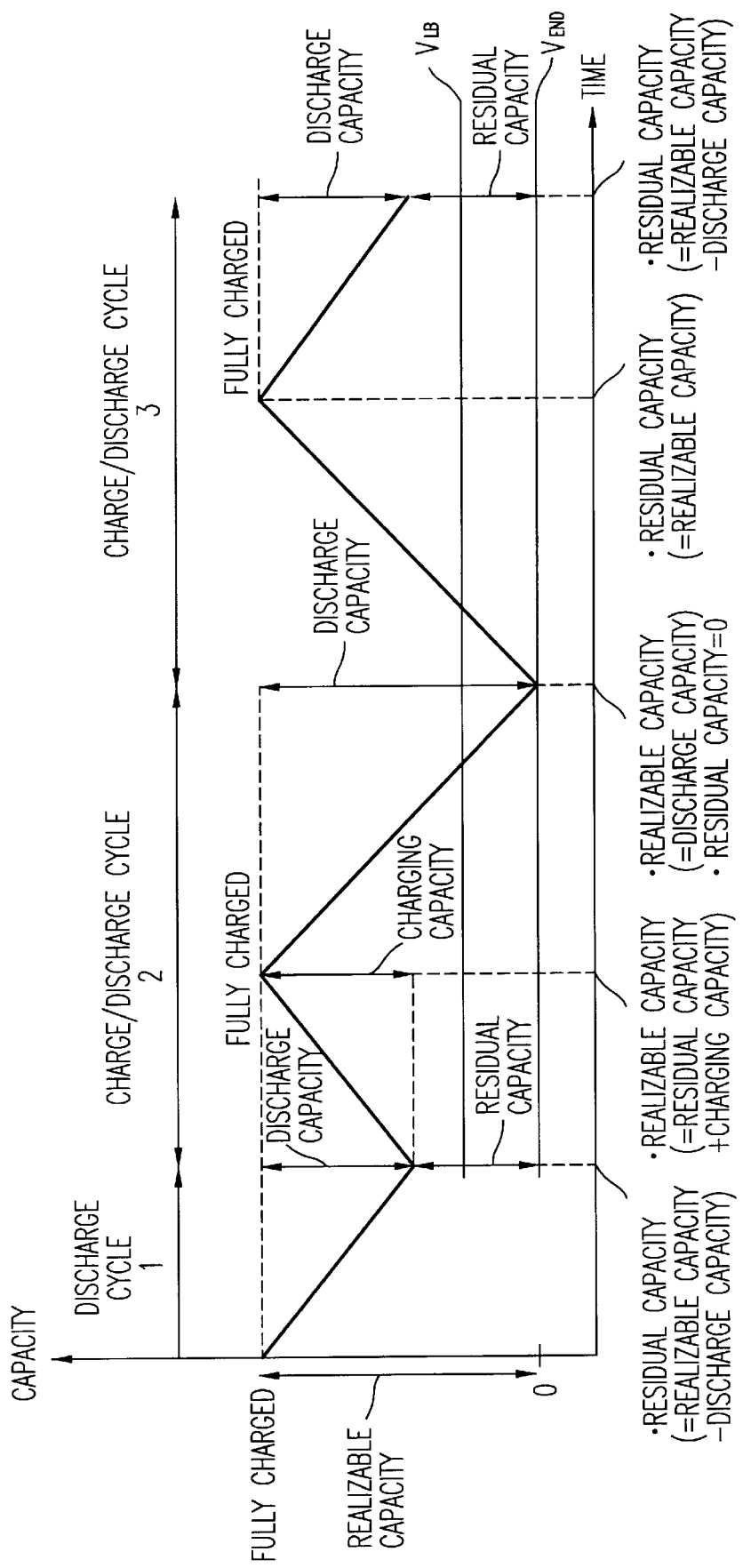
FIG. 4 is a diagram illustrating the relationship between the charge/discharge cycles and the renewal of the battery information when the power source control process shown in FIG. 3 is performed.

FIG. 4 is a diagram for explaining a relationship between the charge/discharge cycles and the updating of the battery information when the control process of the battery power source has been performed as explained in FIG. 3.

FIG. 4 illustrates the repetition of charging/discharging cycles of a fully charged secondary battery. That is, a fully charged battery is repeatedly discharged during its use as a power source and it is repeatedly charged when an AC adaptor power source is used as the power source.

The discharging cycle 1:

This cycle corresponds to the case when the computer system has been turned off or when the discharge of the secondary battery is stopped because the power source for the computer system is supplied through an AC adaptor. During this period when the discharge of the secondary battery is stopped, the residual capacity value of the battery (i.e., the realizable capacity value minus discharge capacity value) is calculated, and a result of the calculation is written into the EEPROM (191).

The charge/discharge cycle 2:

When the power source of the computer system is switched to the AC adaptor, the secondary battery stops discharging and begins to charge. When the battery has been fully charged, the realizable capacity (i.e., the residual capacity plus the charging capacity) is calculated and a result of the calculation is written into the EEPROM (191).

Then, the secondary battery is again discharged when it is used as the power source of the computer. When the low-battery voltage ($V_{LB}$) is detected, a user switches the power source from the secondary battery to the AC adaptor power source. However, according to the present invention, the discharging of the secondary battery continues until the battery voltage $V_{BAT}$ reaches the discharge end voltage $V_{END}$. At that time, the realizable capacity equals the discharged capacity and the residual capacity equals zero. These values are written into the EEPROM (191).

The charge/discharge cycle 3:

When the residual capacity of the battery becomes zero (i.e., the battery reaches the discharge end voltage $V_{END}$), the battery is again charged through the AC adaptor power source. When the battery has been fully charged, the residual capacity equals the realizable capacity and is calculated and written into the EEPROM (191).

According to this forced discharging of the battery to the discharge end voltage $V_{END}$, and by updating the realizable capacity of the battery at the time of the discharge end voltage $V_{END}$, it becomes possible to correct the realizable capacity value by eliminating the accumulated errors during the calculations up to that time. Consequently, it is possible to obtain an appropriate value for the present battery state.

The forced discharging of the battery to the discharge end voltage $V_{END}$ is performed only when the low-battery state is detected to avoid needlessly discharging the battery. Consequently, it becomes possible to always control the present battery state correctly since the accumulated error in the calculation of the realizable capacity and the residual capacity during the repetition of the charge/discharge cycles can be cleared to zero each time the low-battery state is detected.

FIG. 4 explained the case when the discharge of the secondary battery is started from the fully charged state performed by the AC adaptor. If, however, the computer system is powered ON without the secondary battery being fully charged, the discharge of the secondary battery begins from the discharge state at that time. In such a case, the realizable capacity does not need to be updated in the battery information updating process performed during the forced discharging of the secondary battery. It is enough to update only the residual capacity and its value is set to zero. In this way, it is also possible to clear to zero the accumulated error in the residual capacity. Accordingly, it is possible to obtain the latest value of the realizable capacity as a calculated value of the charged capacity from the battery discharge end voltage $V_{END}$ to the fully charged state.

It is also possible to control the present battery state by using only the residual capacity value. In this case, it is possible to update only the residual capacity value and to set that value to zero in the battery information updating process when the battery was forcefully discharged to the discharge end voltage $V_{END}$.

Figure 5A:
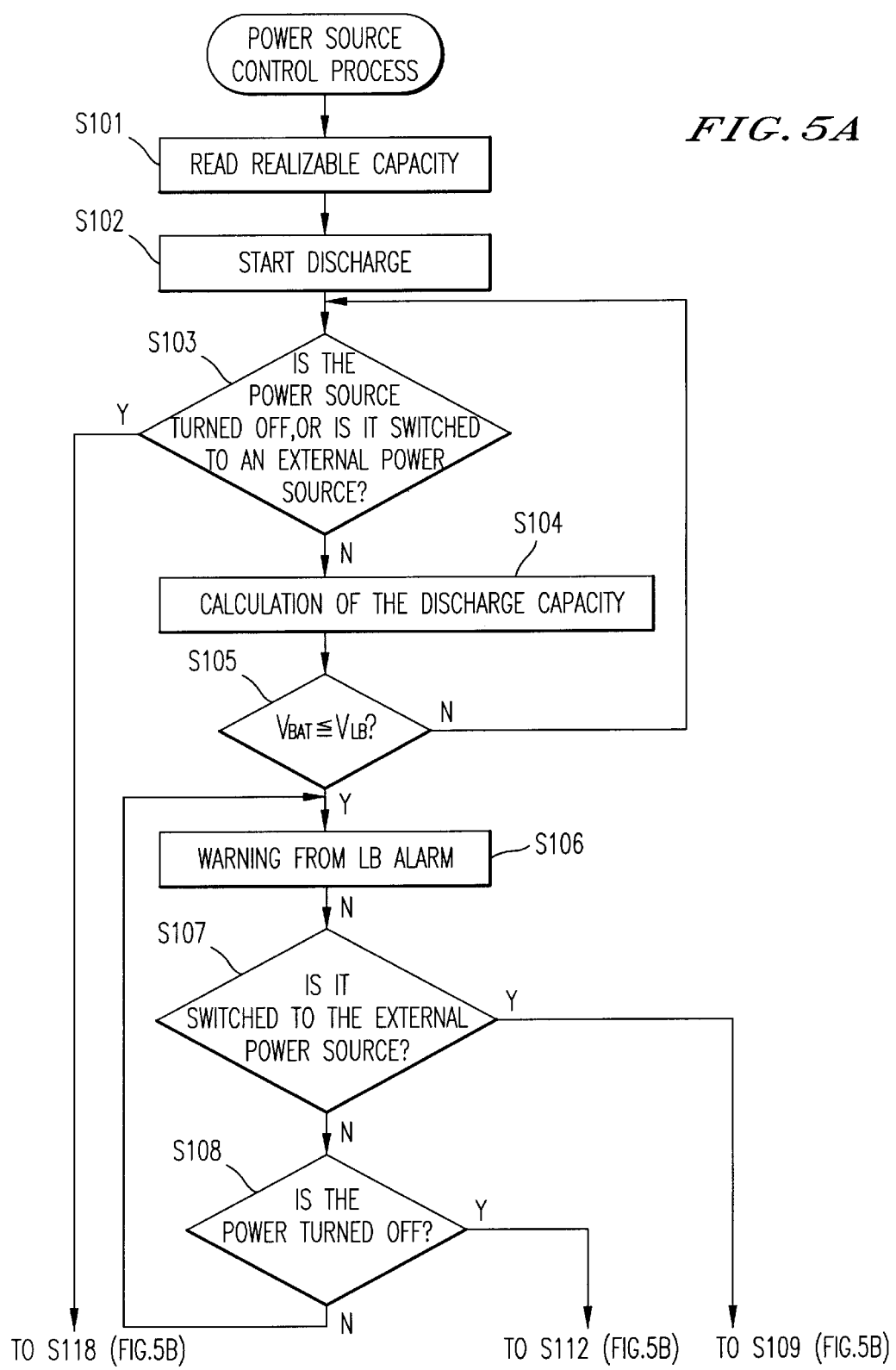
FIG. 5 is a flow chart illustrating another power source control process of a computer using the power source control device shown in FIG. 2.
Figure 5B:
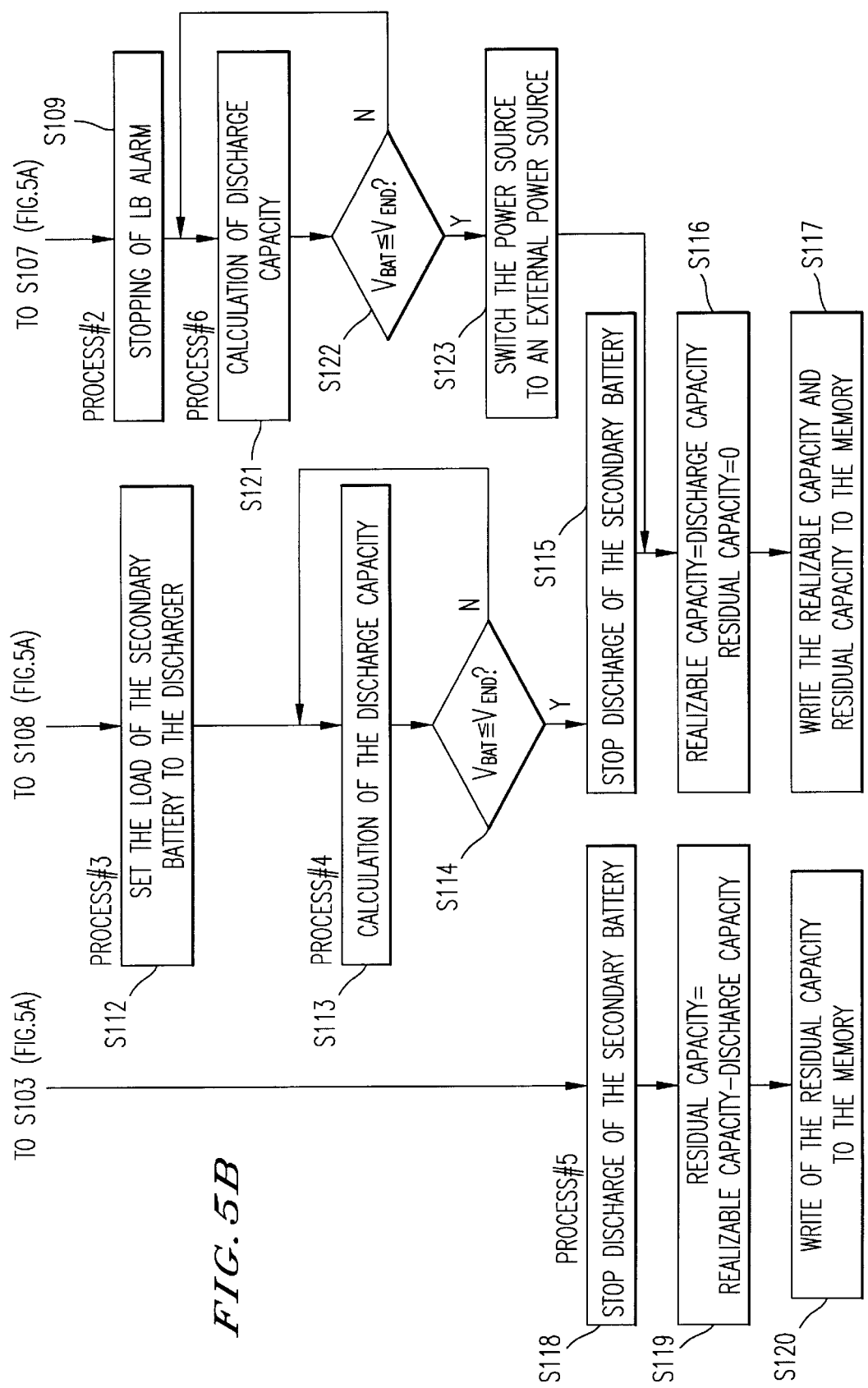

FIG. 5 explains another embodiment of the controlling process of the power source for the computer system according to the present invention.

In this embodiment, the forced discharging of the secondary battery to the discharge end voltage $V_{END}$ is realized by continuing to use the secondary battery to drive the computer, instead of coupling the discharger as explained in the first embodiment. The same steps as shown in FIG. 3 are indicated with the same numbers for eliminating a duplication of the explanation.

When it becomes possible to switch to the AC adaptor after detecting the low-battery state of the battery (Step S107), the power source control process executes the process #6 after the warning of the low-battery state at the process #2 is stopped. In the process #6, the discharge capacity is calculated (Step S121) and then the battery voltage $V_{BAT}$ is checked to determine whether it is equal to or less than the discharge end voltage $V_{END}$ (step S122).

If the battery voltage $V_{BAT}$ drops lower than the discharge end voltage $V_{END}$, the power source for the computer is switched from the secondary battery to the AC adaptor power source by means of the switching circuit (301) in FIG. 1, and the discharging of the secondary battery is stopped (step S123). Then, the process performs the steps S116 and S117 in process #4.

By means of the explained process, it is also possible to clear to zero the accumulated calculation error of the realizable capacity and residual capacity without using the discharger.

Figure 6:
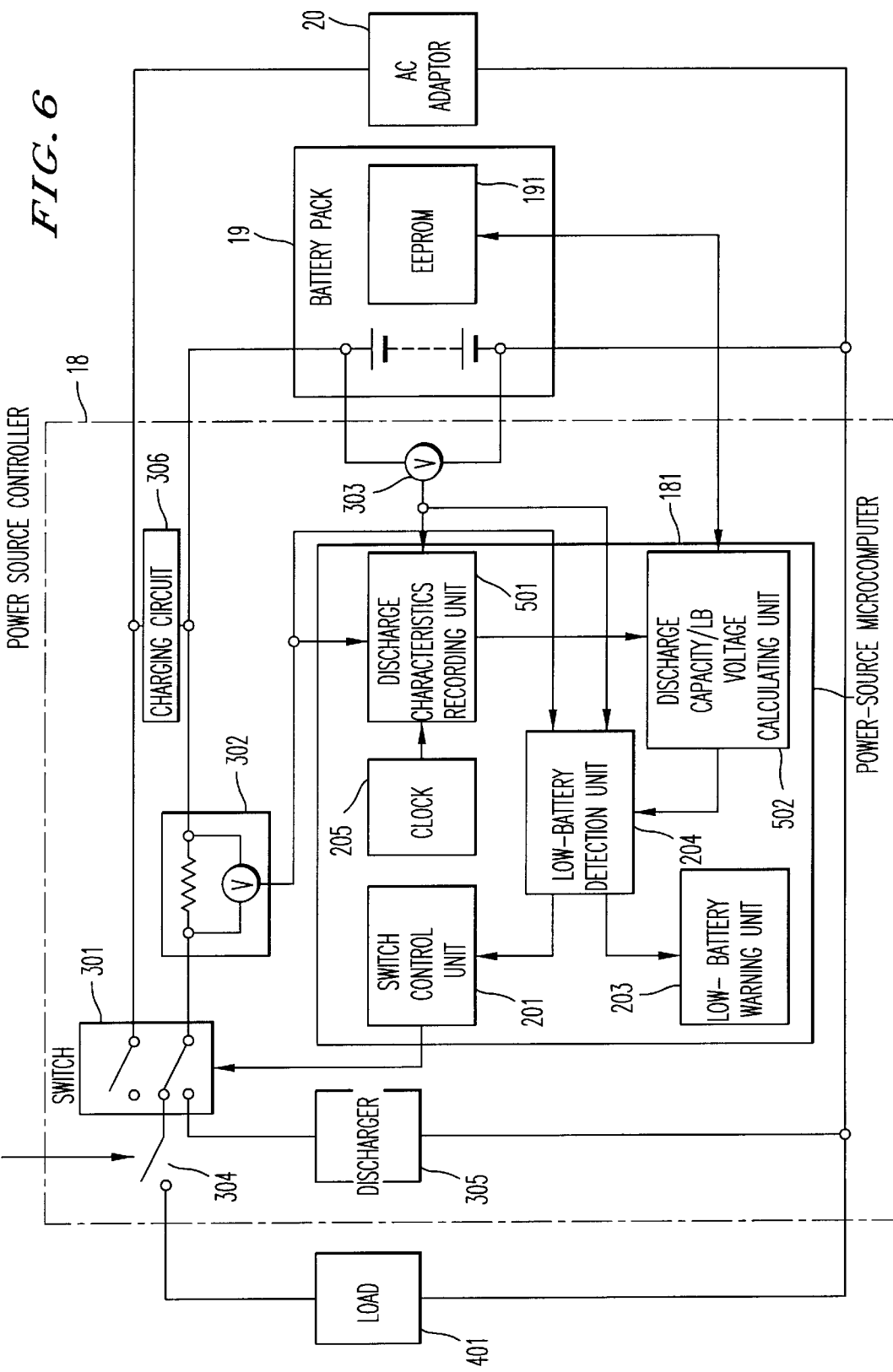
FIG. 6 is a diagram illustrating a second embodiment of a power source control device.

FIG. 6 is a diagram illustrating the structure of the power source controller (18) for use in the second embodiment. Only the power source microcomputer (181) is different from the one shown in FIG. 2, while the other structural features are similar to those in FIG. 2. The power source microcomputer (181) has a discharging characteristics record unit (501) and a discharge capacity/low-battery voltage calculating unit (502) in place of the capacity calculating unit (202) in FIG. 2.

On the basis of the discharge characteristics during the forced discharging of the battery to the discharge end voltage $V_{END}$, not only is the calculation of the realizable capacity and the residual capacity performed but the correction of the low-battery detecting voltage $V_{LB}$ is also performed.

The discharging characteristic recording unit (501) records a discharging current, a discharging time and a battery voltage that are successively measured by an ammeter (302), a clock (205), and a voltage meter (303), respectively. This discharging characteristics information is also collected. The discharge capacity/low-battery voltage calculating unit (502) calculates the realizable capacity value and the residual capacity value, and also calculates the low-battery detecting voltage $V_{LB}$ based on the discharging characteristics during the forced discharging of the battery to the discharge end voltage $V_{END}$.

Figure 7A:
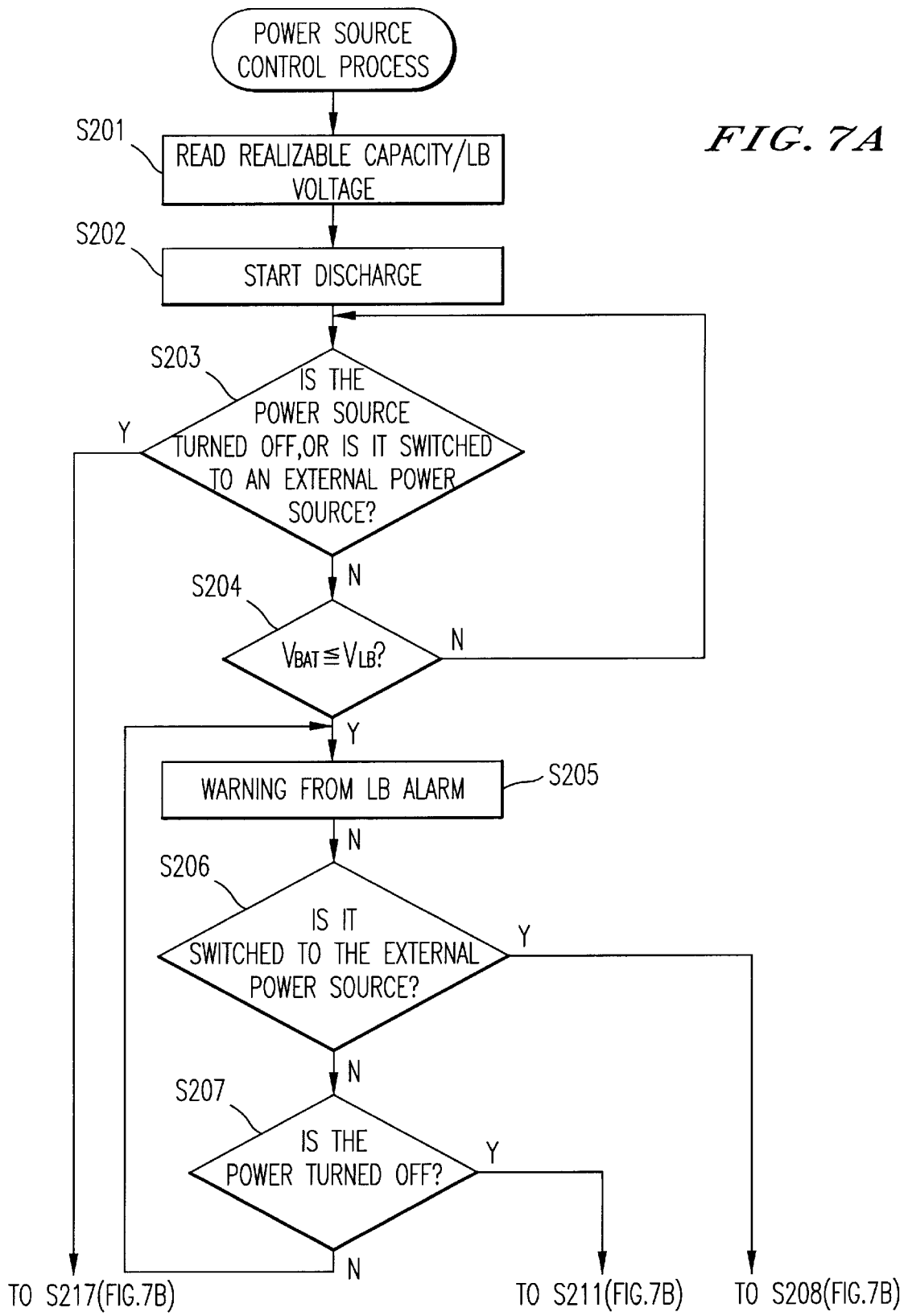
FIG. 7 is a flow chart illustrating the power source control process of a computer using the power source control device shown in FIG. 6.
Figure 7B:
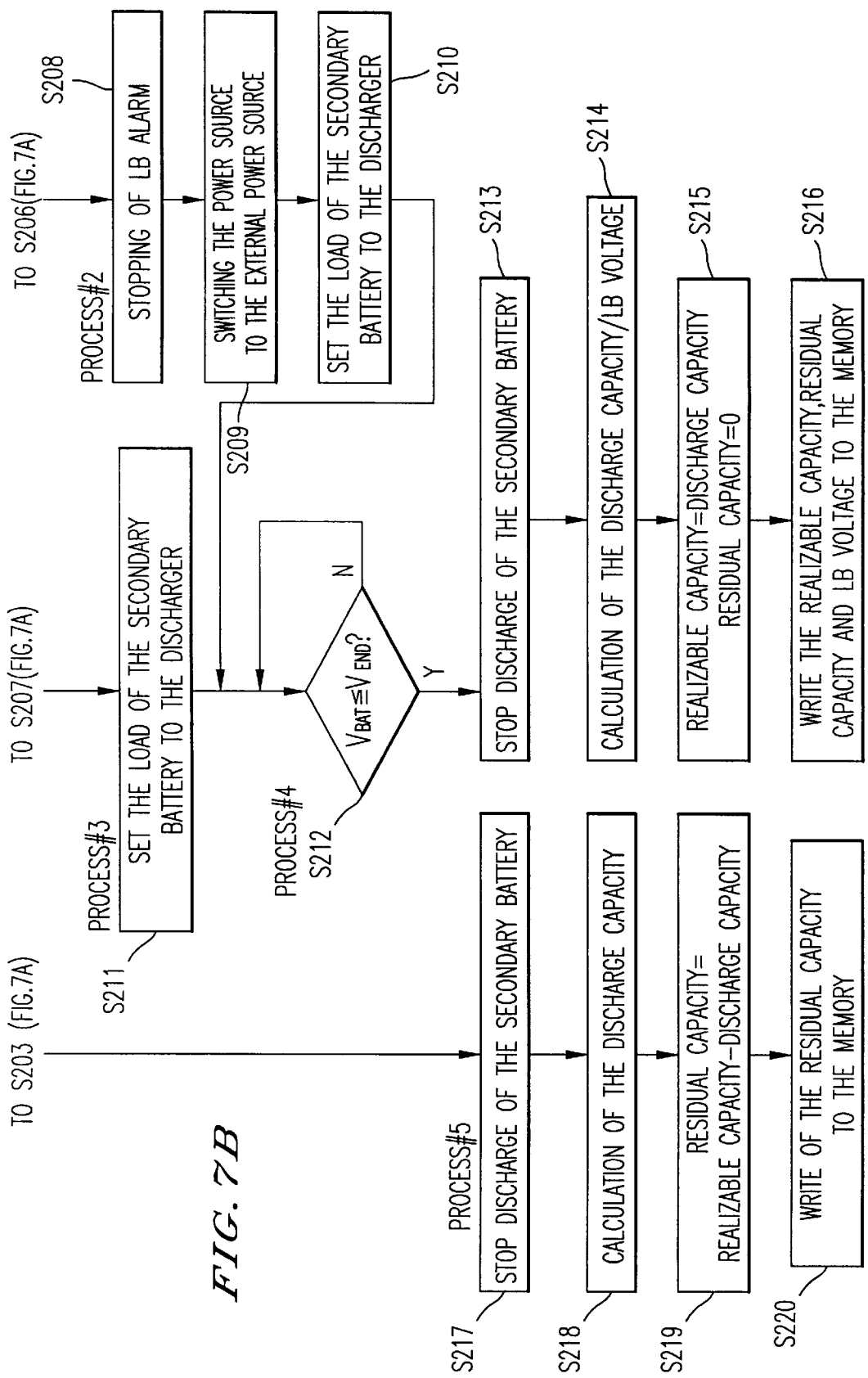

FIG. 7 illustrates the steps for the power source control process used for the power source microcomputer (181) in FIG. 6.

As the battery pack is installed in the main body of the computer, the power source microcomputer (181) reads the realizable capacity and low-battery detection voltage $V_{LB}$ from the EEPROM (191) (step S201). Then, the computer is powered by the secondary battery. That is, the discharging of the secondary battery begins to start as the power source switch is turned on the computer and the switching circuit (304) is coupled to the load (401) (step S202). During the use of the secondary battery, it is continuously checked as to whether or not the low-battery state is reached (step S204).

If the computer is turned on or the AC adaptor power source is supplied before the low-battery state is detected (step S203), the control process executes the process #5. Then, the power source of the computer is switched from the secondary battery to the AC adaptor power source, so that the discharge of the secondary battery is stopped (step S217). After that, the power source microcomputer (181) calculates the discharge capacity from the discharging characteristics up to that point recorded by the discharge charging recording unit (501) (step S218). The present residual capacity of the secondary battery is obtained by subtracting the discharge capacity from the realizable capacity read from the EEPROM (191) (step S219). The result is then written into the EEPROM (191) (step S220). As the power source is switched to the AC adaptor power source, the charging of the secondary battery is started and continued until the secondary battery has been fully charged, as long as the AC adaptor power source is supplied.

If the low-battery state is detected during the discharge of the secondary battery (step S204), a warning to the user is made by an alarm unit (step S205) so that the user can switch to the AC adaptor power source. Then, the control process executes the process #2.

In the process #2, the alarm from the low-battery warning unit (203) is stopped (step S208). Then, the power source of the computer is switched from the secondary battery to the AC adaptor by switching the connection of the switching circuit (step S209). The secondary battery is then coupled to a discharger for continuing the discharge of the battery (step S210).

After that, the control process executes the process #4. In the process #4, the battery voltage $V_{BAT}$ is checked to determine whether or not it has reached the discharge end voltage $V_{END}$ (step S212).

When the battery voltage $V_{BAT}$ drops below the discharge end voltage $V_{END}$, the discharging of the secondary battery is stopped by separating the battery from the discharger by operation of the switching circuit (step S213).

The discharged capacity of the secondary battery during the period from the fully charged state to the discharge end voltage $V_{END}$ and also the low-battery detection voltage $V_{LB}$ are calculated on the basis of the discharging characteristics of the secondary battery (step S214).

Figure 8:
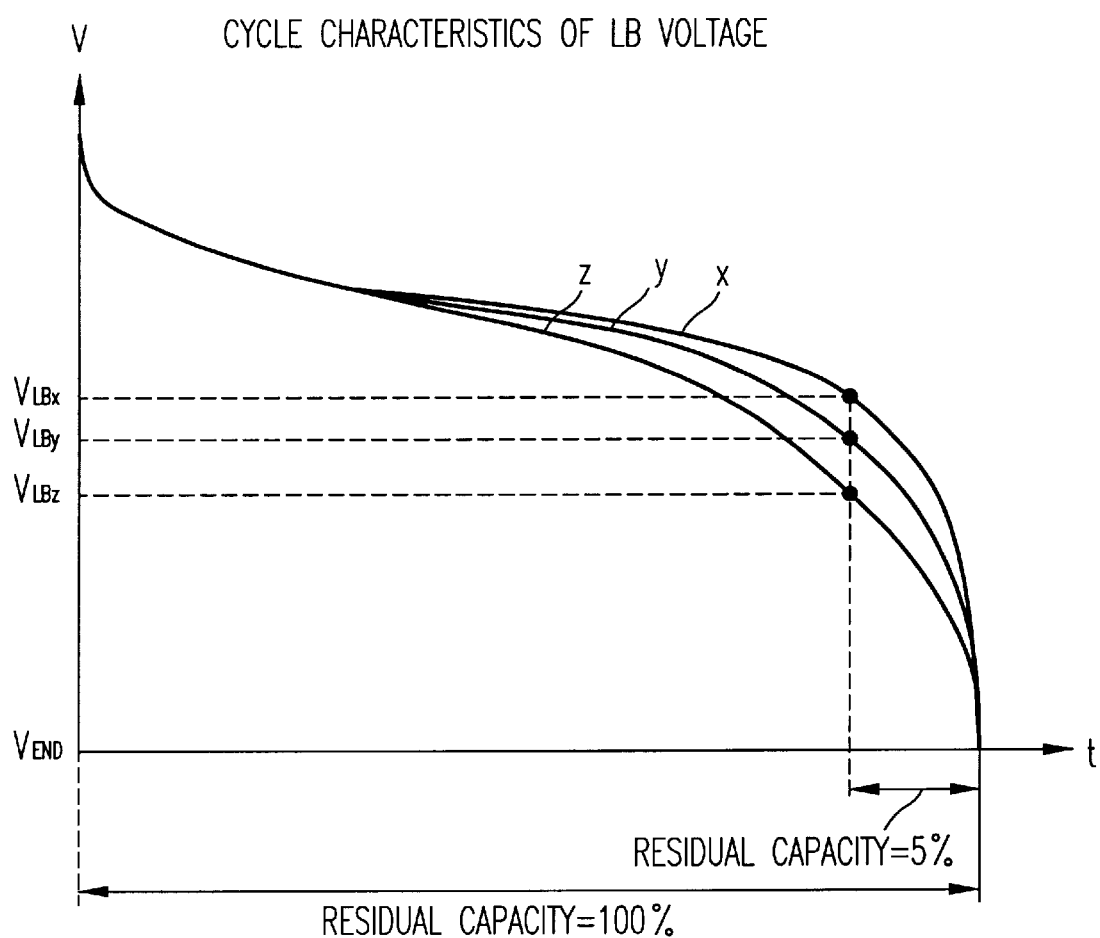
FIG. 8 is a diagram illustrating the operation of a correction of a low-battery detection voltage in a case when the power source control process shown in FIG. 7 is performed.

The low-battery detecting voltage $V_{LB}$ is determined when the value of the residual capacity of the secondary battery becomes a prescribed value, for example, about 5% value of the realizable capacity, as shown in FIG. 8.

Consequently, it is possible to dynamically adjust the values of the low-battery detecting voltage $V_{LB}$ by changing to the respective elements $V_{LBX}$, $V_{LBY}$, and $V_{LBZ}$ corresponding to the discharge characteristics change (x, y, z).

Now, with reference to FIG. 7, the calculated discharged value becomes the latest realizable capacity, and the latest residual capacity value is reset to zero (step S215). The values are then written into the EEPROM (step S216).

If the computer is turned off after detecting the low-battery state (step S207), the control process executes the process #3 in which the secondary battery is coupled to a discharger (step S211). Then, the process #4 is performed as explained before.

In the above, the explanation was made with an assumption that the discharging of the secondary battery started from the fully charged state. If the discharging of the secondary battery begins from a partially charged state, the realizable capacity value of the battery is not updated. Only the residual capacity value is updated and its value is set to zero in the battery information updating process performed when the secondary battery is forced to discharge to the discharge end voltage $V_{END}$.

Since the accumulated error in the residual capacity value can be cleared to zero in this way, it is also possible to calculate the latest realizable capacity value as the value of the charging capacity from the discharge end voltage $V_{END}$ to the fully charged state.

Further, it is possible to control the present battery state by using only the residual capacity value. In this case, too, it is possible to update only the residual capacity value and to set that value to zero in the battery information updating process performed when the battery is forcefully discharged to the discharge end voltage $V_{END}$.

Figure 9A:
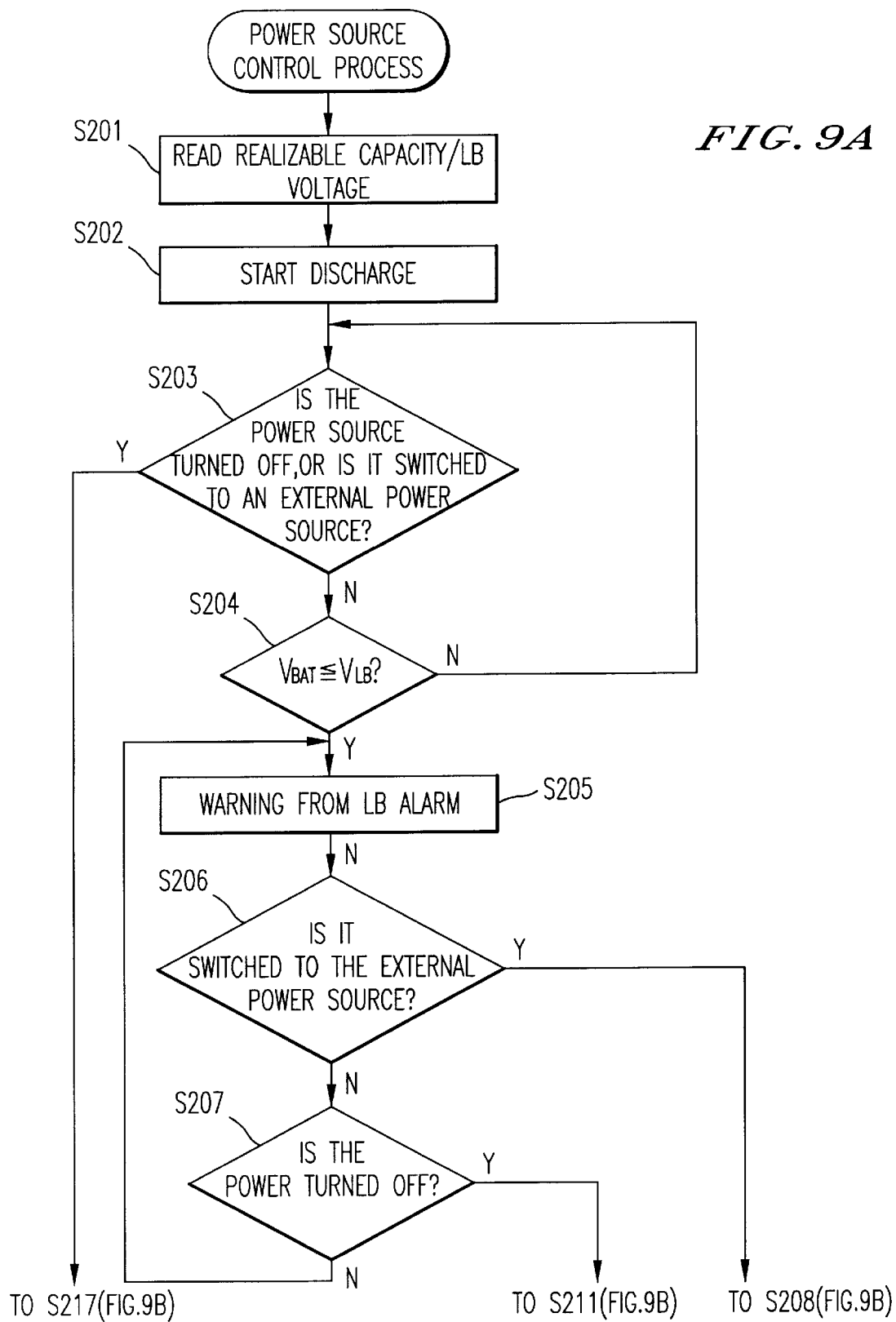
FIG. 9 is a flow chart illustrating another power source control process of a computer using the power source control device shown in FIG. 6.
Figure 9B:
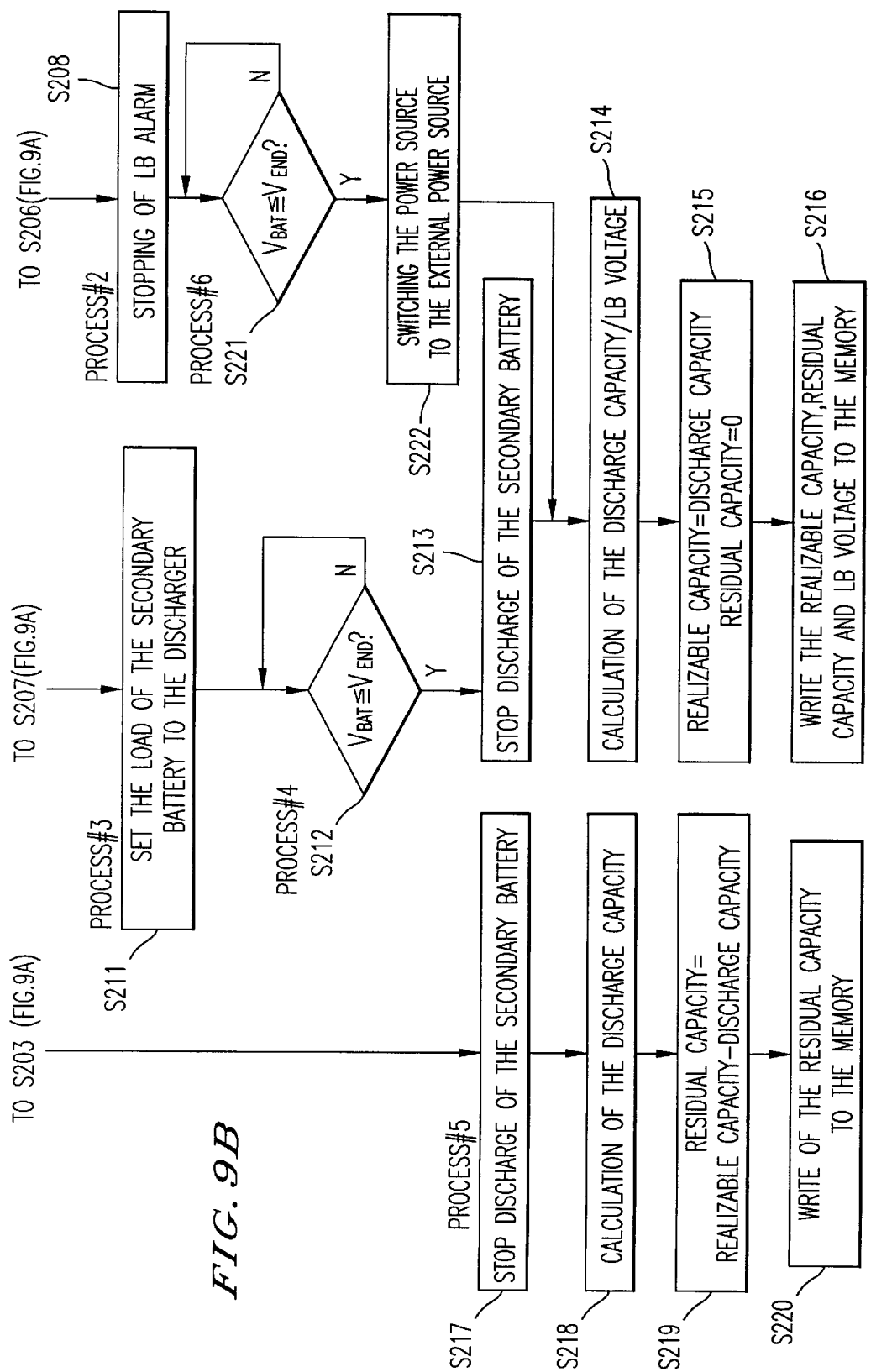
Figure 10:
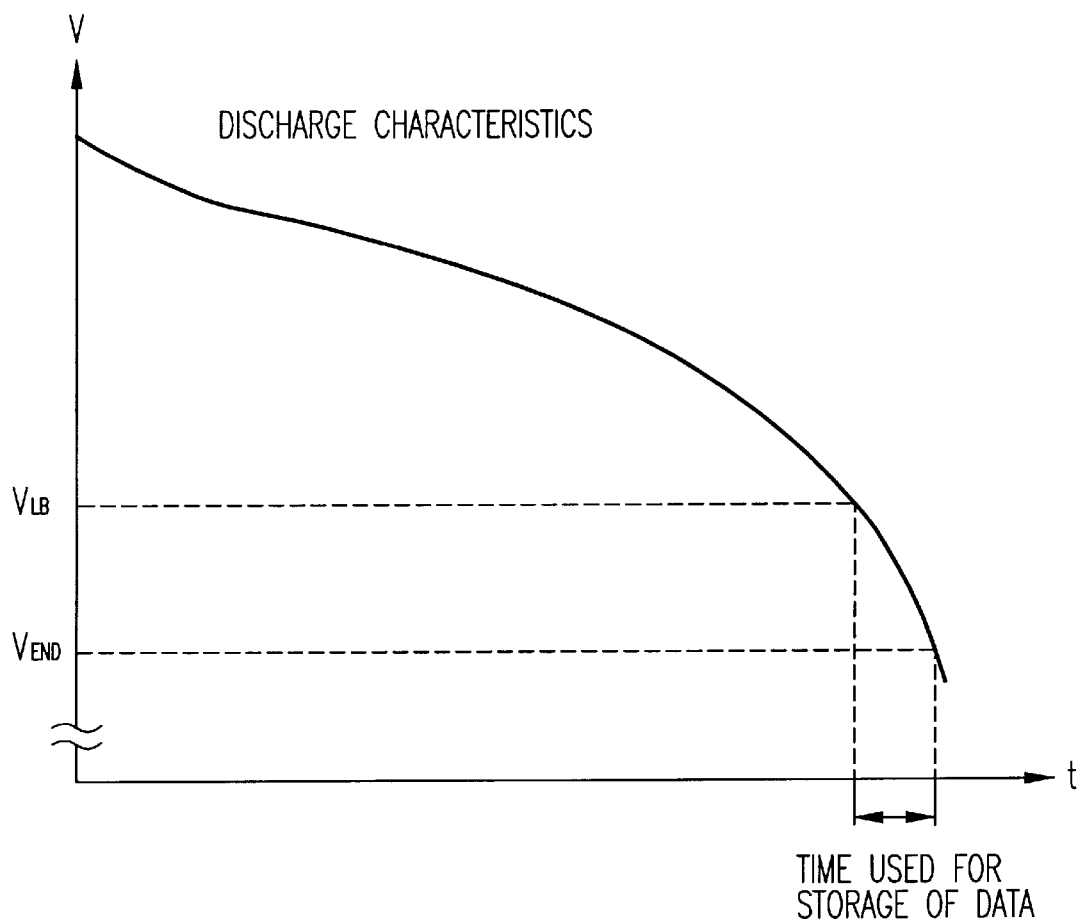
FIG. 10 is a diagram illustrating typical discharge characteristics of a secondary battery.
Figure 11:
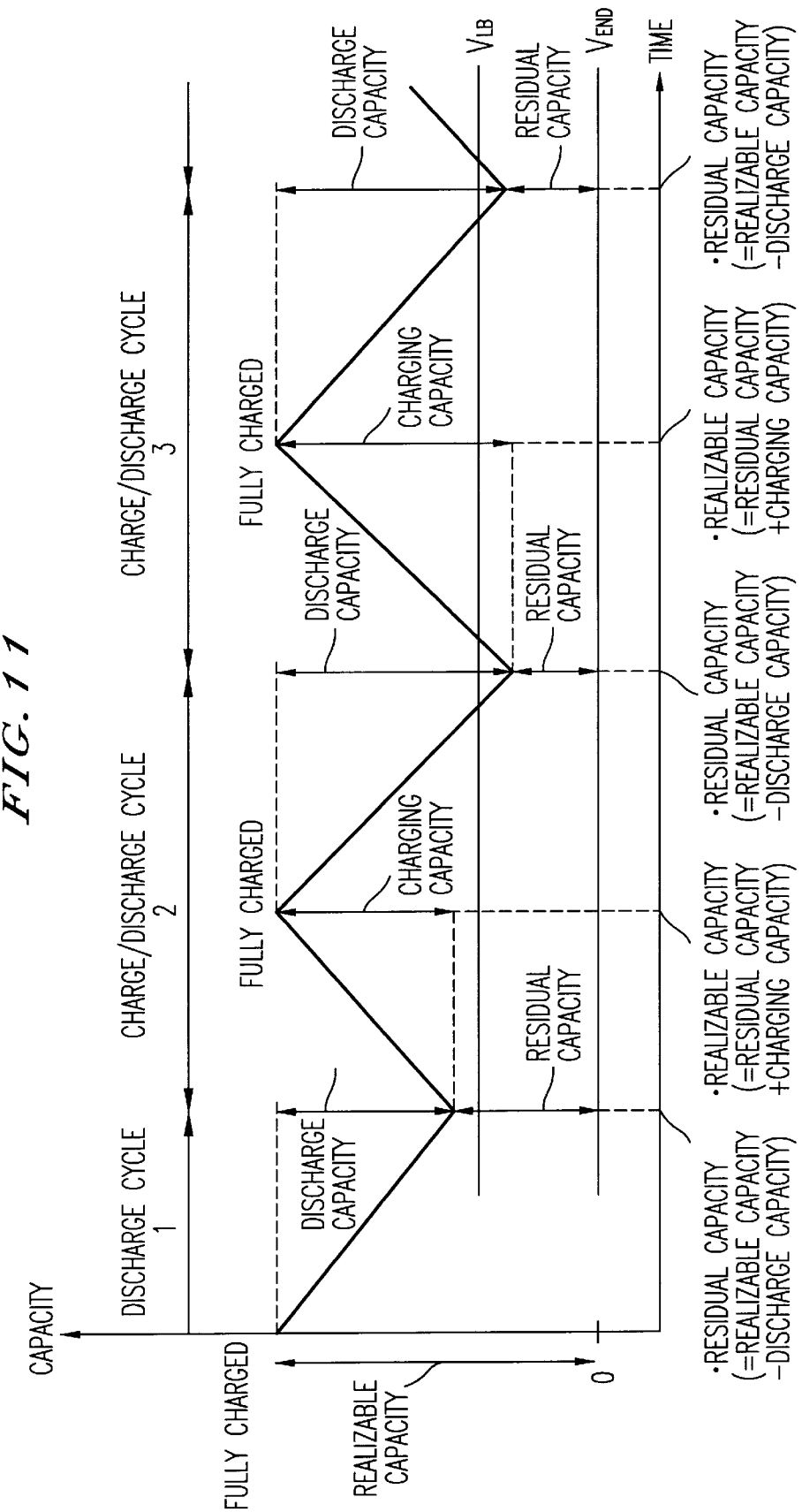
FIG. 11 is a diagram illustrating the relationship between the charge/discharge cycles and the battery information for a conventional power source control device.

FIG. 9 is still another embodiment of the power source control process shown in FIG. 7.

In this case, the forceful discharge of the secondary battery to the discharge end voltage $V_{END}$ is performed by continuing to provide power to the computer through the secondary battery, instead of coupling the battery to the discharger.

When the low-battery state is detected and it is possible to switch to the AC adaptor power source, the alarm of the low-battery state is stopped in the process #2. Then, the control process executes the process #6 to determining whether the battery voltage $V_{BAT}$ is equal to or lower than the discharge end voltage $V_{END}$ (step S221).

If the battery voltage $V_{BAT}$ is lower than the discharge end voltage $V_{END}$, the power source for the computer is switched from the secondary battery to the AC adaptor and the discharging of the secondary battery is stopped (step S222). Then, the steps S214, S215 and S216 in the process #4 are executed as explained before.

According to this process, it is also possible to clear to zero the calculation error of the realizable capacity and residual capacity without using the discharge.

As explained above, according to the present invention, it is possible to regularly clear to zero the calculation errors of the realizable capacity and residual capacity that are accumulated during the repeated charging/discharging cycles.

Consequently, it is possible always to control the present battery state correctly. Further, it is possible to detect the low-battery state by always detecting the optimum low-battery detecting voltage by adjusting the value through the dynamic low-battery voltage detection corresponding to the change of the discharging characteristics of the battery.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An apparatus for controlling a battery, comprising:
   a memory which stores a realizable capacity and residual capacity of the battery, said realizable capacity of the battery corresponds to a maximum discharge capacity of the battery between a fully charged state and a prescribed discharged end state and said residual capacity value corresponds to a usable residual time for using the battery;
   first means for detecting a discharged capacity value of the battery corresponding to a difference between the fully charged state and a final discharged state;
   second means for detecting a prescribed low-battery state;
   means for discharging the battery to the prescribed discharged end state after said second means for detecting detects said prescribed low-battery state; and
   means for updating the battery information stored in the memory by setting the detected discharge capacity value equal to a latest realizable capacity value.

2. The apparatus according to claim 1, wherein the means for updating the battery information obtains a latest residual capacity value of the battery by substracting the discharged capacity value from the realizable capacity value stored in the memory, when the battery is switched OFF before the prescribed low-battery state is detected.

3. The apparatus according to claim 2, wherein the latest residual capacity is updated when the means for discharging stops discharging the battery.

4. The apparatus according to claim 1, further comprising:
   third means for detecting discharge characteristics of the battery by monitoring a voltage and a discharge current of the battery.

5. The apparatus according to claim 4, further comprising:
   means for updating the prescribed low-battery state using the detected discharge characteristics when the means for discharging discharges the battery to the prescribed discharged end state.

6. The apparatus according to claim 1, wherein the prescribed low-battery state is a first voltage value stored in the memory and the prescribed discharge end state is a second voltage value stored in the memory.

7. The apparatus according to claim 6, wherein the second means for detecting detects the prescribed low-battery state when a voltage value of the battery is less than the first voltage value stored in the memory.

8. The apparatus according to claim 4, wherein the first means for detecting the discharged capacity value detects the discharged capacity value using the detected discharge characteristics of the battery.

9. The apparatus according to claim 1, wherein the means for updating revises the battery information each time the battery is charged or discharged.

10. The apparatus according to claim 1, wherein the means for discharging discharges the battery to the prescribed discharge end state while an AC adapter is used in place of the battery.

11. The apparatus according to claim 1, further comprising:
    means for setting the residual capacity to zero when the means for discharging discharges the battery to the prescribed low-battery state.

12. The apparatus according to claim 1, wherein the means for discharging discharges the battery by coupling the battery to a discharger.

13. The apparatus according to claim 1, wherein the means for discharging discharges the battery by continuing to supply power to the apparatus using the battery.

14. A method of controlling a battery, comprising the steps of:
    storing a realizable capacity and residual capacity of the battery, said realizable capacity of the battery corresponds to a maximum discharge capacity of the battery between a fully charged state and a prescribed discharged end state and said residual capacity value corresponds to a usable residual time for using the device;
    detecting a discharged capacity value of the battery corresponding to a difference between the fully charged state and a final discharged state;
    detecting a prescribed low-battery state;
    discharging the battery to the prescribed discharged end state after said step of detecting the low-battery state detects said prescribed low-battery state; and
    updating the battery information stored in the memory by setting the detected discharge capacity value equal to a latest realizable capacity value.

15. The method according to claim 14, wherein the step of updating the battery information obtains a latest residual capacity value of the battery by substracting the discharged capacity value from the realizable capacity value stored in the memory, when the battery is switched OFF before the low-battery state is detected.

16. The method according to claim 15, wherein the latest residual capacity is updated when the step of discharging stops discharging the battery.

17. The method according to claim 14, further comprising the step of:
    detecting discharge characteristics of the battery by monitoring a voltage and a discharge current of the battery.

18. The apparatus according to claim 17, further comprising the step of:
    updating the prescribed low-battery state using the detected discharge characteristics when the step of discharging discharges the battery to the prescribed discharged end state.

19. The method according to claim 17, wherein the step of detecting the discharged capacity value detects the discharged capacity value using the detected discharge characteristics of the battery.

20. The method according to claim 14, wherein the prescribed low-battery state is a first voltage value stored in the memory and the prescribed discharge end state is a second voltage value stored in the memory.

21. The method according to claim 20, wherein the step of detecting the prescribed low-battery state detects the prescribed low-battery state when a voltage value of the battery is less than the first voltage value stored in the memory.

22. The method according to claim 14, wherein the step of updating updates the battery information each time the battery is charged or discharged.

23. The method according to claim 14, wherein the step of discharging discharges the battery to the prescribed discharge end state when an AC adapter is used in place of the battery.

24. The method according to claim 14, further comprising:
    setting the residual capacity to zero when the step of discharging discharges the battery to the prescribed low-battery state.

25. The method according to claim 14, wherein the step of discharging discharges the battery by coupling the battery to a discharger.

26. The method according to claim 14, wherein the step of discharging discharges the battery by continuing to supply power to the apparatus using the battery.

* * * * *